US007738239B2

(12) United States Patent
Yokote et al.

(10) Patent No.: US 7,738,239 B2
(45) Date of Patent: Jun. 15, 2010

(54) ELECTRONIC APPARATUS

(75) Inventors: Satoshi Yokote, Tokyo (JP); Kouji Abe, Tokyo (JP); Tomomi Murayama, Tokyo (JP); Atsushi Tatemichi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 314 days.

(21) Appl. No.: 11/495,941

(22) Filed: Jul. 27, 2006

(65) Prior Publication Data

US 2007/0025071 A1 Feb. 1, 2007

(30) Foreign Application Priority Data

Jul. 29, 2005 (JP) .......................... P2005-221726

(51) Int. Cl.
*G06F 1/16* (2006.01)
(52) U.S. Cl. .......................... 361/679.09; 361/679.08; 200/302.1; 200/341; 341/22; 235/145 R; 345/168; 345/169
(58) Field of Classification Search ................. 361/680, 361/683, 686, 679.01–679.45, 679.55–679.59; 400/682, 82, 691, 692, 693, 488, 489; 341/22; 345/168, 156, 157, 169; 200/302.1; 455/575.1
See application file for complete search history.

(56) References Cited

U.S. PATENT DOCUMENTS 5,923,530 A * 7/1999 Murayama et al. ..... 361/679.09

| | | | | |
|---|---|---|---|---|
| 5,997,229 A * | 12/1999 | Akers | .......................... | 411/373 |
| 7,012,206 B2 * | 3/2006 | Oikawa | .................... | 200/302.1 |
| 7,072,699 B2 * | 7/2006 | Eiden | ...................... | 455/575.8 |
| 7,385,808 B2 * | 6/2008 | Hamada et al. | ............. | 361/680 |
| 2005/0040972 A1 * | 2/2005 | Hamada et al. | ............... | 341/22 |

FOREIGN PATENT DOCUMENTS

| JP | 08-130832 | 5/1996 |
|---|---|---|
| JP | 11-175186 | 2/1999 |
| JP | 2001-142569 | 5/2001 |
| JP | 2001-297813 | 10/2001 |
| JP | 2002-023890 | 1/2002 |
| JP | 2002-090915 | 3/2002 |
| JP | 2003-122454 | 4/2003 |

OTHER PUBLICATIONS

English translation of JPO Office Action, patent application No. JP2005-221726, mailed Dec. 7, 2007.

* cited by examiner

*Primary Examiner*—Jayprakash N Gandhi
*Assistant Examiner*—Nidhi Desai
(74) *Attorney, Agent, or Firm*—Blakely, Sokoloff, Taylor & Zafman LLP

(57) ABSTRACT

According to one embodiment, an electronic apparatus comprises: a casing comprising a circuit module; a keyboard mounting portion on which a keyboard is detachably mounted, and a cover detachably covering the opening. The key board mounting portion comprises an opening which allows a wiring electrically connecting the keyboard and the circuit module to be passed therethrough. An area of the opening is equal to or less than half of an area of the keyboard mounting portion.

19 Claims, 12 Drawing Sheets

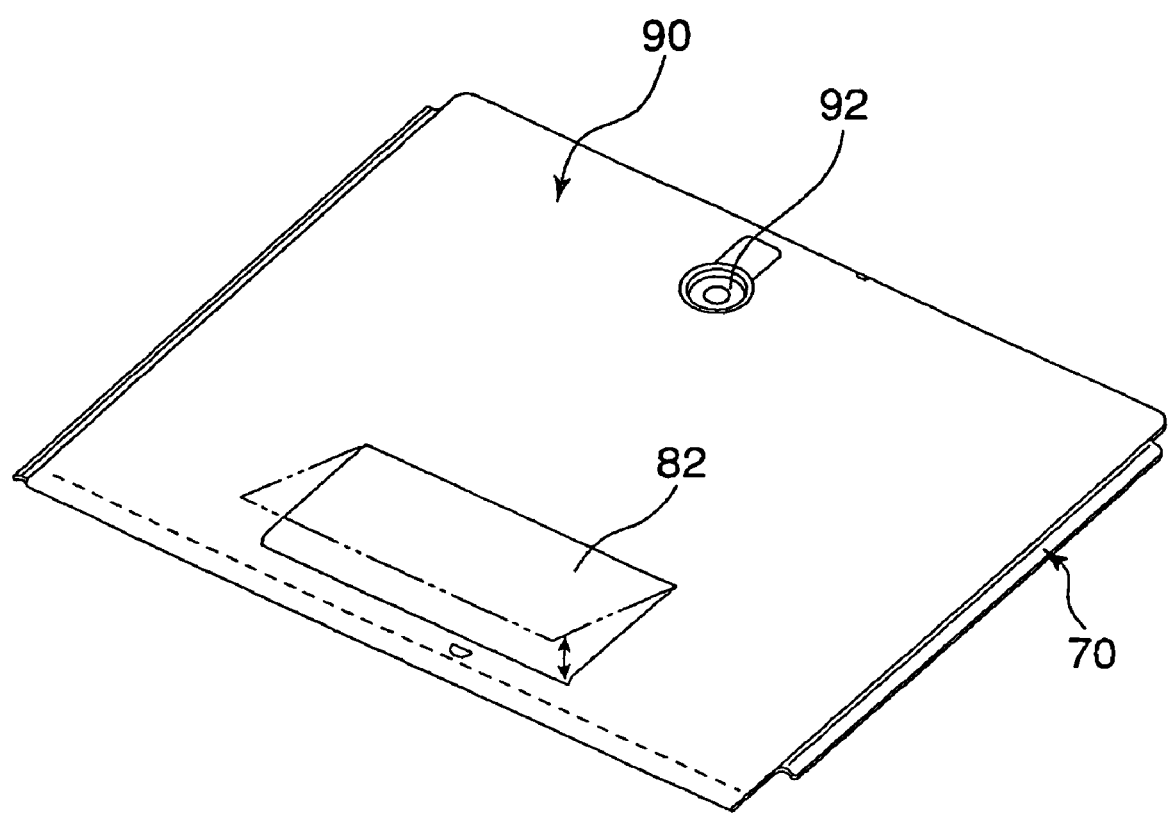

ELECTRONIC APPARATUS

CROSS-REFERENCE TO RELATED APPLICATIONS

This application is based upon and claims the benefit of priority from Japanese Patent Application No. 2005-221726, filed on Jul. 29, 2005, the entire contents of which are incorporated herein by reference.

BACKGROUND

1. Field

One embodiment of the invention relates to an electronic apparatus preventing a liquid such as water from entering thereinto.

2. Description of the Related Art

In general, in an electronic apparatus, e.g., a portable computer, a keyboard and switches are disposed above a circuit module which is formed with electronic circuit parts mounted on a wiring board, so as to realize a compact size.

In this type of electronic apparatus, after the circuit module is accommodated in a casing, the keyboard is disposed on the casing. Therefore, an opening, through which a cable for electrically connecting the circuit module and the keyboard is passed and is used for performing that operation, is formed in a wall portion of the casing. This opening is formed in a wall portion located between the circuit module and the keyboard in the casing, e.g., in an upper wall portion of the casing. The opening is closed by a keyboard baseplate.

However, the keyboard is exposed to the outside such as when the portable computer is in use. Therefore, in the event that a user has spilled a beverage such as water during the use of the portable computer, the beverage conceivably enters through a gap between a baseplate of the keyboard and an edge portion of the opening. The attachment of a liquid such as water to the circuit module is not used.

Therefore, a dripproof structure is provided for the portable computer to prevent the entry of a liquid such as water into the casing.

As a dripproof structure, a discharge hole is formed in the baseplate of the keyboard. The discharge hole communicates with the outside. Therefore, even if a liquid such as water flows into the keyboard, the liquid is discharged to the outside after passing through the discharge hole (e.g., refer to JP-A-2003-122454)

However, even with the dripproof structure disclosed in JP-A-2003-122454, a liquid conceivably enters between an edge of the baseplate of the keyboard and an edge of the opening.

In addition, with the dripproof structure disclosed in the patent document 1, the opening has a size which is substantially equal to the area of the baseplate of the keyboard. Therefore, the opening is relatively large.

Namely, since the length of the edge of the opening is long, the entry of a liquid such as water into the casing is conceivable.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 18 is a perspective view illustrating a hole covering insulator of the portable computer in accordance with a second embodiment of the invention.

DETAILED DESCRIPTION

Various embodiments according to the invention will be described hereinafter with reference to the accompanying drawings. In general, according to one embodiment of the invention, an electronic apparatus comprises: a casing comprising a circuit module; a keyboard mounting portion on which a keyboard is detachably mounted, and a cover detachably covering the opening. The key board mounting portion comprises an opening which allows a wiring electrically connecting the keyboard and the circuit module to be passed therethrough. An area of the opening is equal to or less than half of an area of the keyboard mounting portion.

Referring to FIGS. 1 to 17, a description will be given of an electronic apparatus in accordance with a first embodiment of the invention by citing a portable computer 10 as an example.

Figure 1:
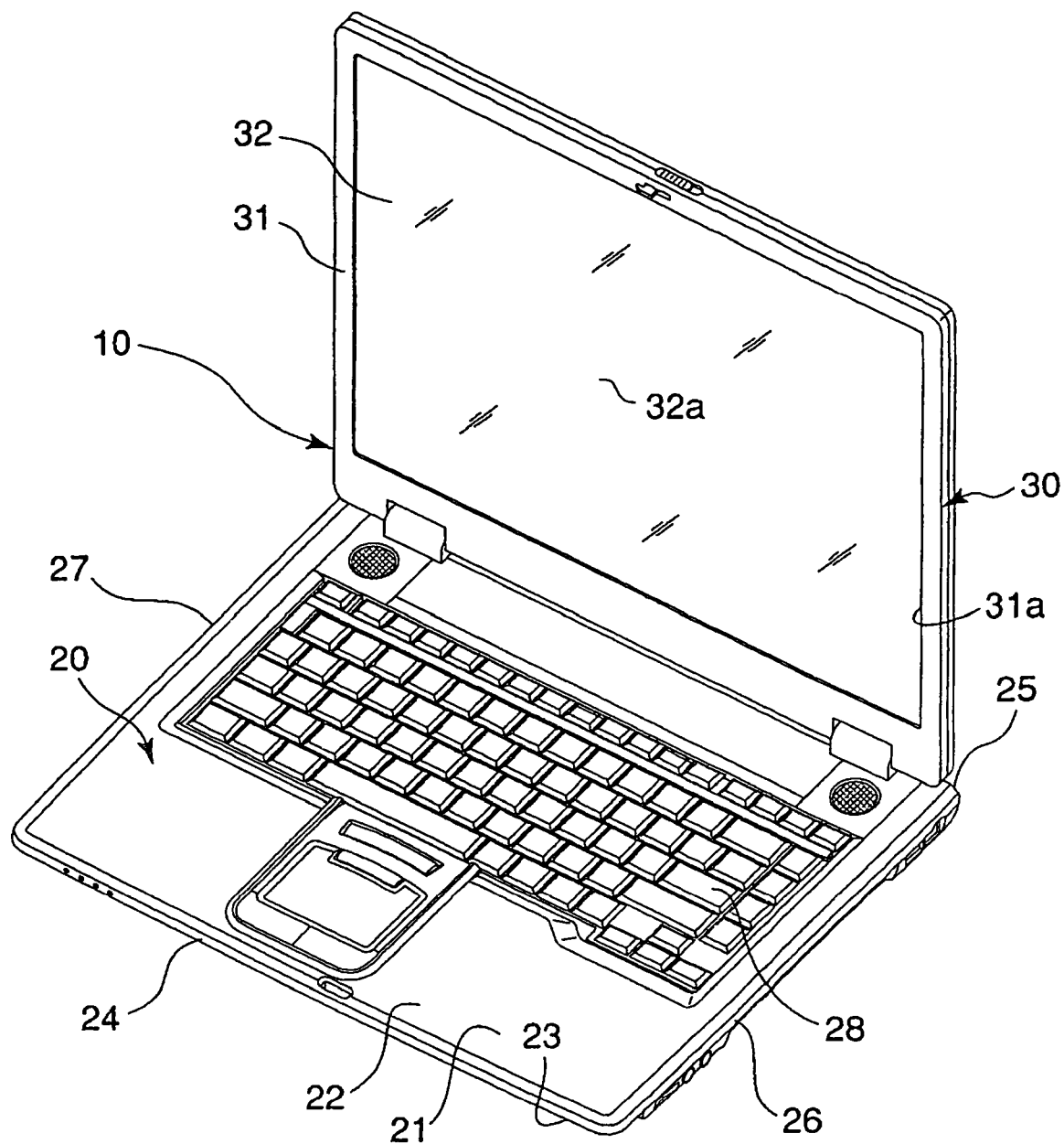
FIG. 1 is an exemplary perspective view illustrating a portable computer according to a first embodiment of the invention.

FIG. 1 shows the portable computer 10. The portable computer 10 includes a computer body 20 and a display unit 30, as shown in FIG. 1.

The computer body 20 has a casing 21, a keyboard 28, and a circuit module 40 as described below.

The casing 21 is formed in the shape of a flat box. The casing 21 has an upper wall portion 22, a lower wall portion 23, a front wall portion 24, a rear wall portion 25, a right wall portion 26, and a left wall portion 17. The keyboard 28 is installed on the upper wall portion 22. The circuit module 40 is accommodated in the casing 21.

In the casing 21, the rear wall portion 25 side is higher than the front wall portion 24 side in view of operability of the keyboard 28. The front side of the keyboard 28 is inclined downward.

The display unit 30 includes a display unit housing 31 and a liquid crystal display panel 32. The liquid crystal display panel 32 is accommodated in the display unit housing 31. The liquid crystal display 32 has a screen 32a which displays an image. The screen 32a is exposed to the outside of the display unit housing 31 through an opening 31a formed on the front surface of the display unit housing 31.

The display unit 30 is connected to the computer body 20 by hinges (unillustrated).

The display unit 30 is rotatable between a closed state and an open state. The closes state is a state in which the display unit 30 is laid over the computer body 20 so as to cover the keyboard 28 from above. The open state is a state in which the display unit 30 is made upright with respect to the computer body 20 so as to expose the keyboard 28 and the screen 32a.

Figure 2:
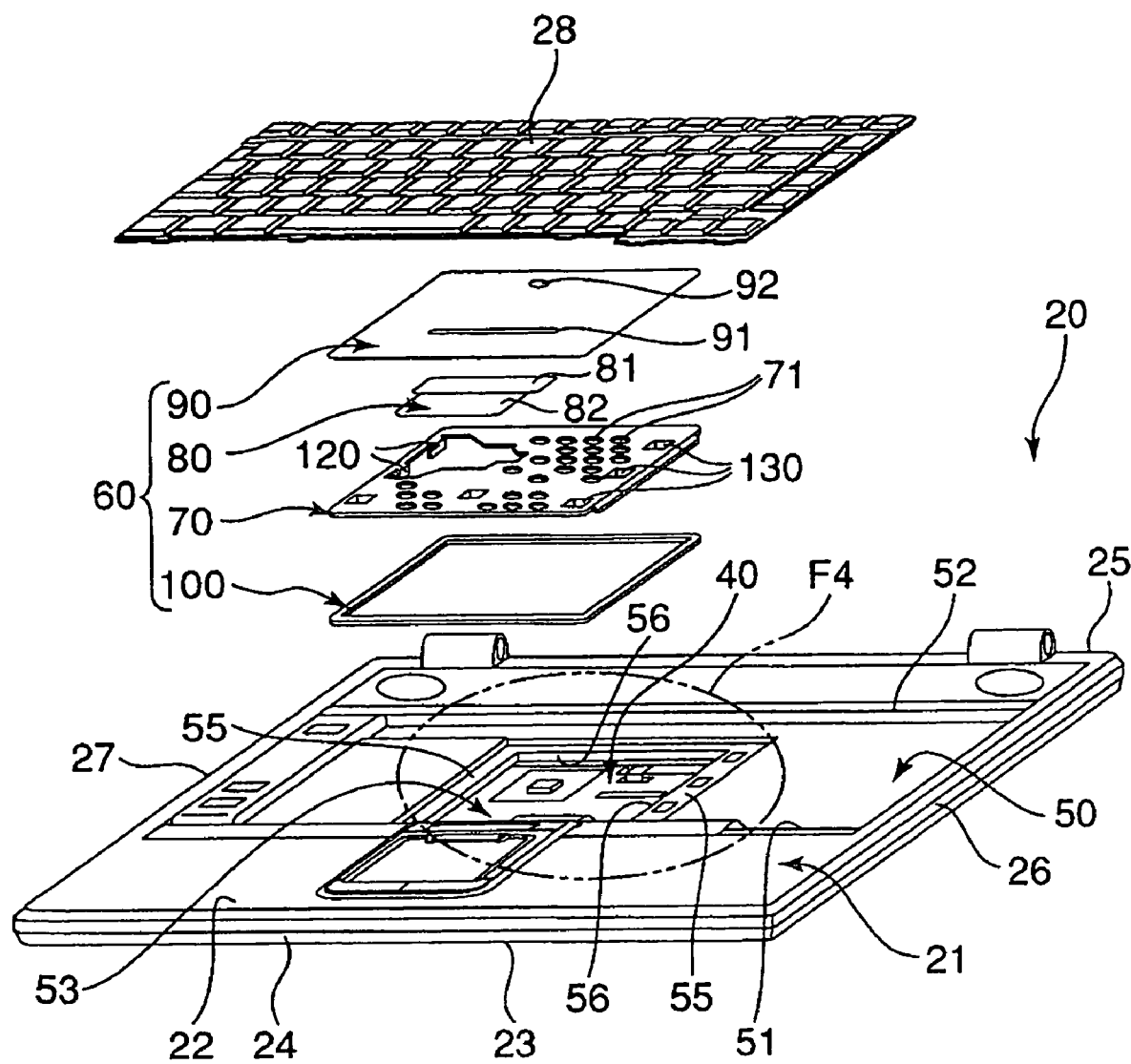
FIG. 2 is an exemplary perspective view illustrating a state in which a computer body shown in FIG. 1 is disassembled.

FIG. 2 exemplary shows a state in which the computer body 20 is disassembled. A keyboard mounting portion 50 is formed on the upper wall portion 22 of the casing 21, as shown in FIG. 2. The keyboard 28 is mounted on the keyboard mounting portion 50. The keyboard mounting portion 50 is recessed relative to the portion of the upper wall portion 22 other than the keyboard mounting portion 50. A front edge 51 of the keyboard mounting portion 50 is opposed to the front wall portion 24 of the casing 21. A rear edge 52 of the keyboard mounting portion 50 is opposed to the rear wall portion 25 of the casing 21.

Figure 3:
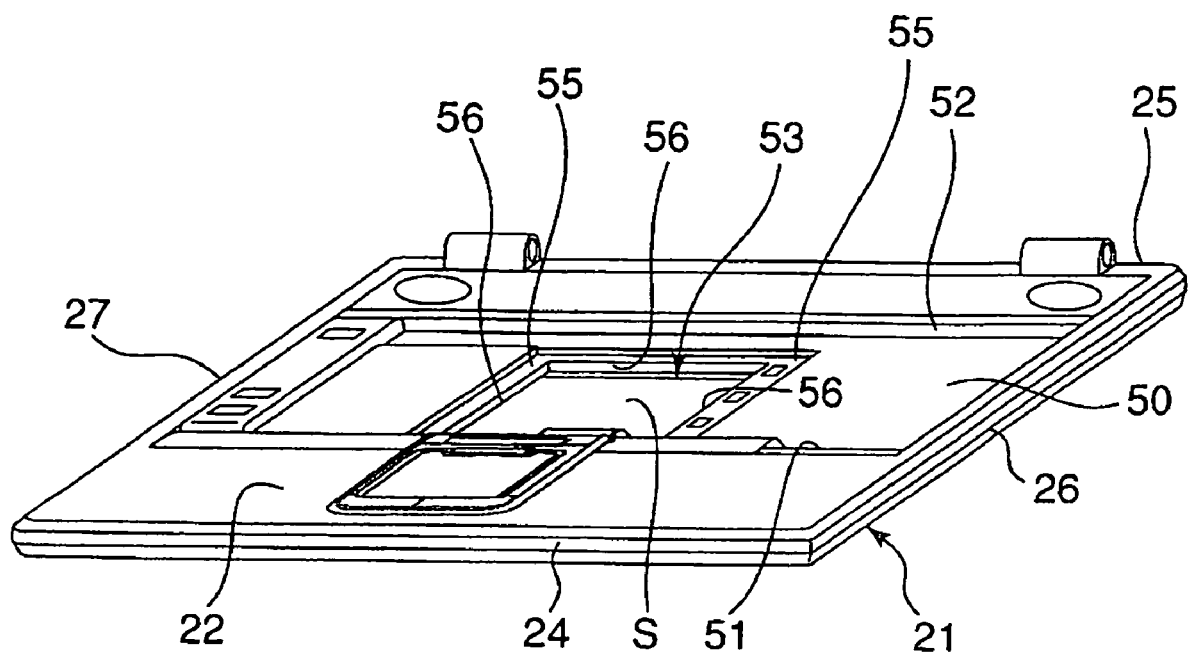
FIG. 3 is an exemplary perspective view illustrating an upper wall portion of a casing shown in FIG. 2.

An opening 53 is formed in the keyboard mounting portion 50. FIG. 3 exemplary shows the upper wall portion 22 of the casing 21 in enlarged form.

The opening 53 penetrates the keyboard mounting portion 50 (upper wall portion 22). Edge portions 55 of the opening 53 are formed one step lower than the keyboard mounting portion 50. The edge portions 55 are portions close to edges 56 of the opening 53.

The opening 53 is disposed in the vicinity of a substantially widthwise center of the keyboard mounting portion 50. The opening 53 is substantially rectangular. The circuit module 40 is not accommodated in the casing 21 shown in FIG. 3.

The range occupied by the opening 53, i.e., an opening area S of the opening 53, is equal to or less than half of the area occupied by the keyboard mounting portion 50. In the embodiment, the range occupied by the opening 53, i.e., the opening area S, is, for example, 30 percent of the range occupied by the keyboard mounting portion 50. The range occupied by the opening 53 may be 10 to 30 percent of the range occupied by the keyboard mounting portion 50.

Figure 4:
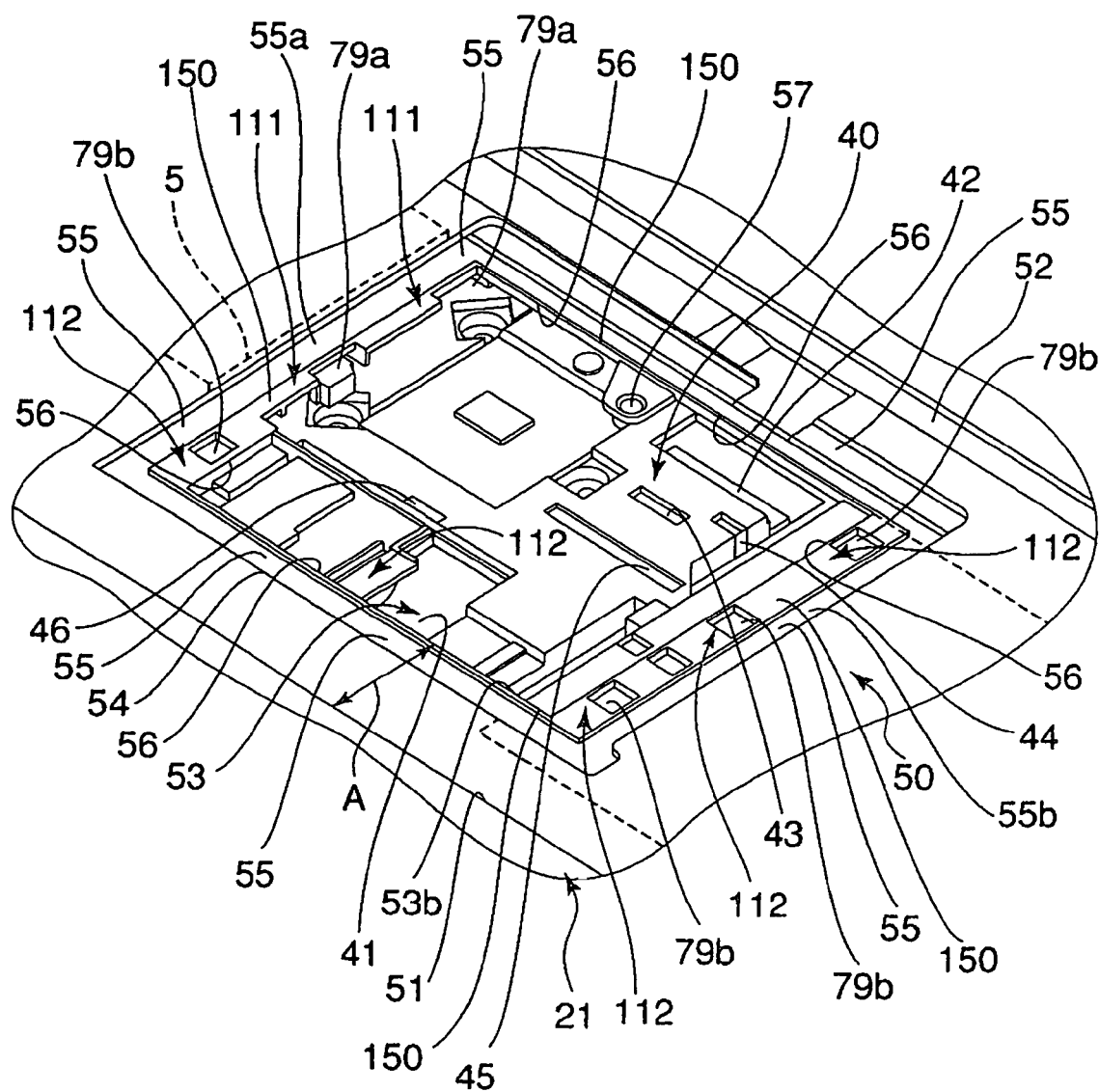
FIG. 4 is an exemplary perspective view illustrating in enlarged form the range of F4 indicated by a two-dot chain line in FIG. 2.

The circuit module 40 is accommodated in the casing 21 shown in FIG. 2. FIG. 4 exemplary shows in enlarged form the range of F4 indicated by a two-dot chain line in FIG. 2. As shown in FIGS. 2 and 4, a portion of the circuit module 40 is exposed to the outside of the casing 21 through the opening 53 in a state where the keyboard 28 and a slide cover 70, as described later, are not installed on the casing 21.

As shown in FIG. 4, a front edge 53b of the opening 53 is located rearwardly of the front edge 51 of the keyboard mounting portion 50. A gap A is defined between the front edge 51 of the keyboard mounting portion 50 and the front edge 53b of the opening 53.

The circuit module 40 includes a wiring board 41 and parts mounted on the wiring board 41. The parts mounted on the wiring board 41 include a harness connector 42 for a liquid crystal display, a switch board connector 43, a speaker connector 44, a keyboard connector 45, and a touch pad connector 46.

The harness connector 42 for a liquid crystal display, the switch board connector 43, the speaker connector 44, the keyboard connector 45, and the touch pad connector 46, as described above, are parts to which wirings to be connected from outside the casing 21 are electrically connected after the circuit module 40 is accommodated in the casing 21.

The harness connector 42 for a liquid crystal display, the switch board connector 43, the speaker connector 44, the keyboard connector 45, and the touch pad connector 46 are mounted on the wiring board 41 in a range opposed to the opening 53.

The harness connector 42 for a liquid crystal display, the switch board connector 43, the speaker connector 44, the keyboard connector 45, and the touch pad connector 46 are exposed to the outside through the opening 53 in the state where the keyboard 28 and the slide cover 70 are not installed on the casing 21.

The electronic parts, which are mounted on the wiring board 41 in the range opposed to the opening 53, are not limited to the harness connector 42 for a liquid crystal display, the switch board connector 43, the speaker connector 44, the keyboard connector 45, and the touch pad connector 46, as described above.

Apart from the above-described parts, parts which are accessed from outside the casing 21 after the circuit module 40 is accommodated in the casing 21 may be mounted on the wiring board 41 in the range opposed to the opening 53.

The portable computer 10 which is formed in the above-described manner has a dripproof construction 60 for preventing the entry of a liquid such as water into the casing 21 through the opening 53.

As exemplary shown in FIG. 2, the dripproof construction 60 has the slide cover 70, a grip member 80, a first hole closing insulator 90, a seal member 100, an engaging mechanism 110, and a second hole closing insulator 200.

Figure 5:
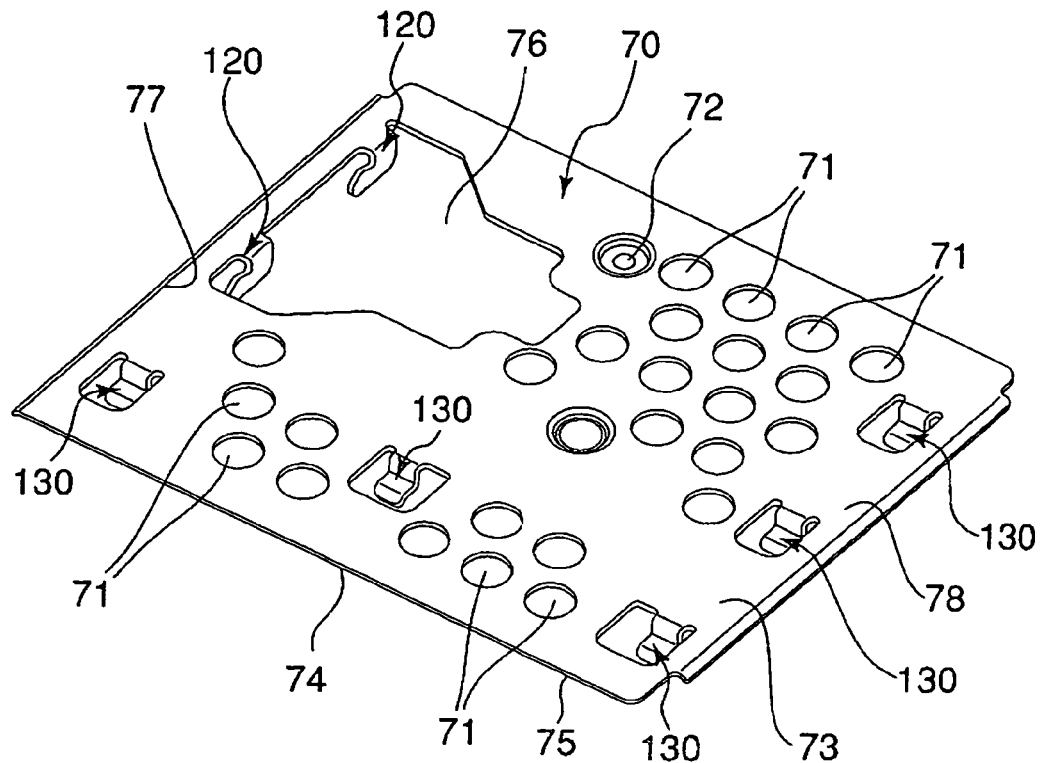
FIG. 5 is an exemplary perspective view illustrating a slide cover shown in FIG. 2.
Figure 6:
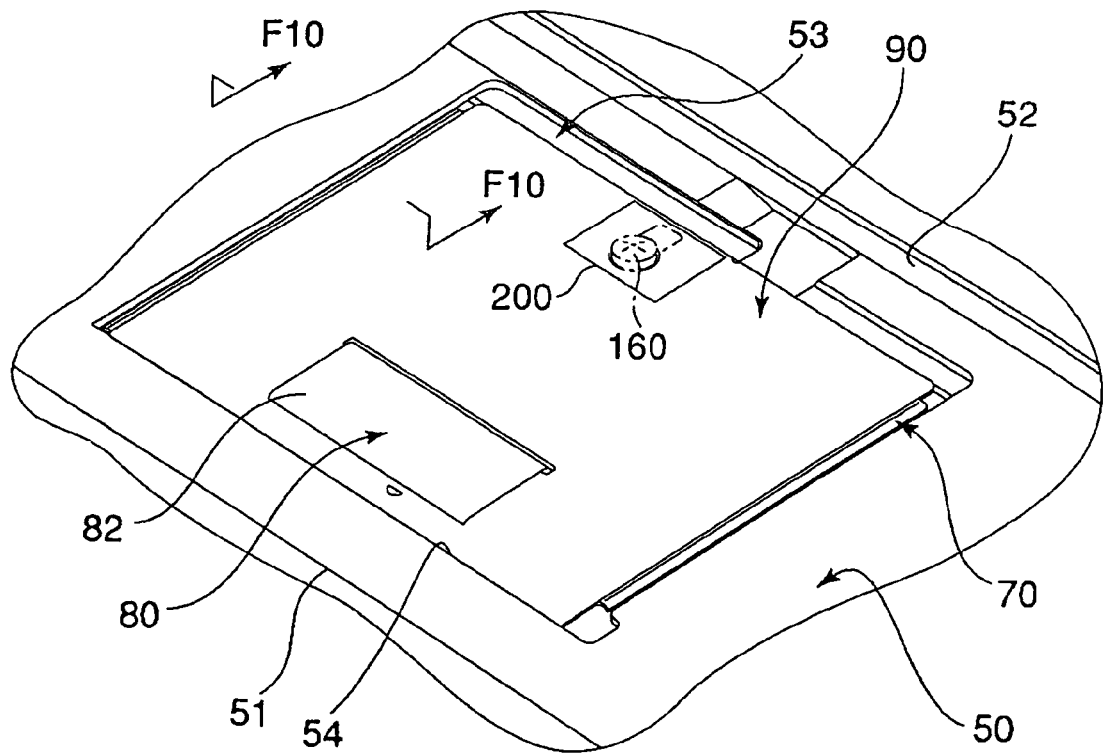
FIG. 6 is an exemplary perspective view illustrating a state in which the slide cover shown in FIG. 2 is fixed to the casing.

FIG. 5 shows the slide cover 70. The slide cover 70 covers the opening 53. FIG. 6 shows a state in which the slide cover 70 covers the opening 53. It should be noted that the grip member 80 and the first hole closing insulator 90, which will be described later, are mounted on the slide cover 70 in FIG. 6. As shown in FIG. 6, the slide cover 70 is substantially rectangular, and has a size which covers the entire region (the opening area S) of the opening 53 and covers substantially the entire regions of the edge portions 55 of the opening 53.

The thickness of the slide cover 70 corresponds to the depth from the upper surface of the keyboard mounting portion 50 to the upper surface of the edge portion 55. Therefore, if the slide cover 70 is installed on the casing 21, an upper surface 73 of the slide cover 70 becomes substantially flush with the upper surface of the keyboard mounting portion 50.

As exemplary shown in FIG. 5, a plurality of through holes 71 are formed in the slide cover 70. Each through hole 71 penetrates the slide cover 70. In addition, a through hole 72, through which a below-described screw 160 is passed, is formed in the slide cover 70. The slide cover 70 is formed of, for example, a metallic material.

The grip member 80 is installed on the upper surface 73 of the slide cover 70. The grip member 80 is made of, for example, a resin and is in the form of a thin film. The grip member 80 has a fixed portion 81 and a grip portion 82.

Figure 7:
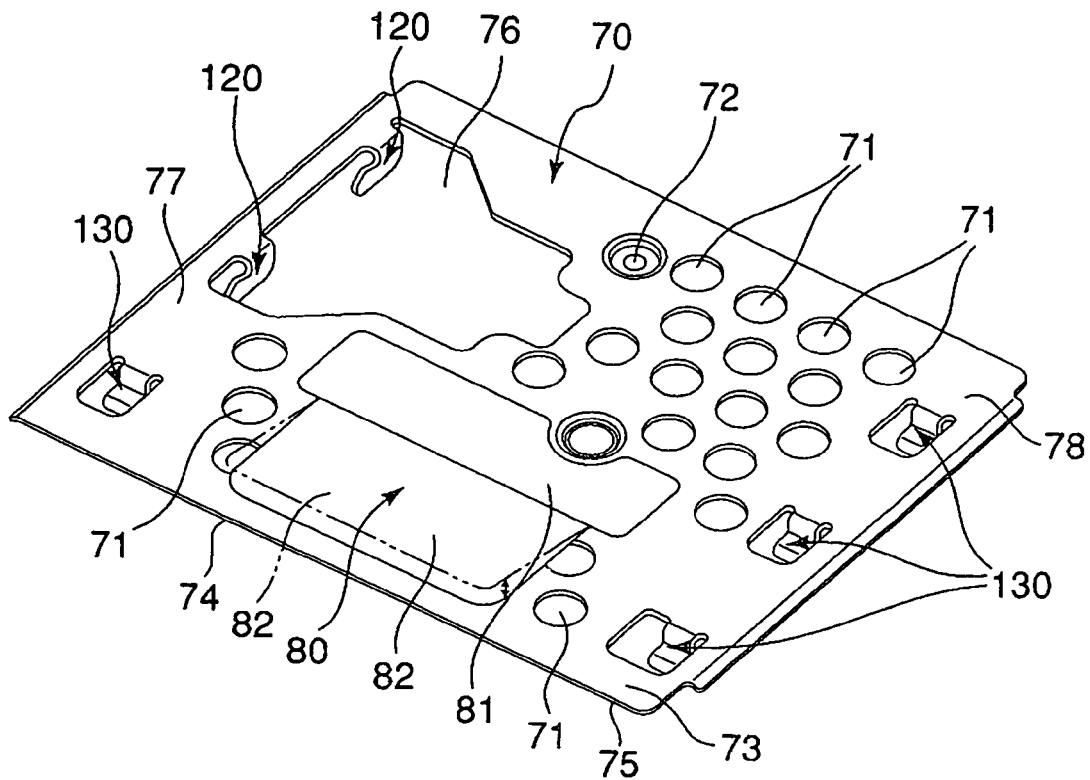
FIG. 7 is a perspective view illustrating a state in which a grip member is fixed to the slide cover shown in FIG. 2

FIG. 7 exemplary shows a state in which the grip member 80 is installed on the upper surface 73 of the slide cover 70. The fixed portion 81 is fixed to the upper surface 73 of the slide cover 70, as shown in FIG. 7. The fixed portion 81 may be fixed by such as an adhesive or a double-sided adhesive tape. The grip portion 82 is formed integrally with the fixed portion 81, but is not fixed to the slide cover 70. Therefore, the grip portion 82 is movable with respect to the slide cover 70, as shown by a two-dot chain line in FIG. 7.

Figure 8:
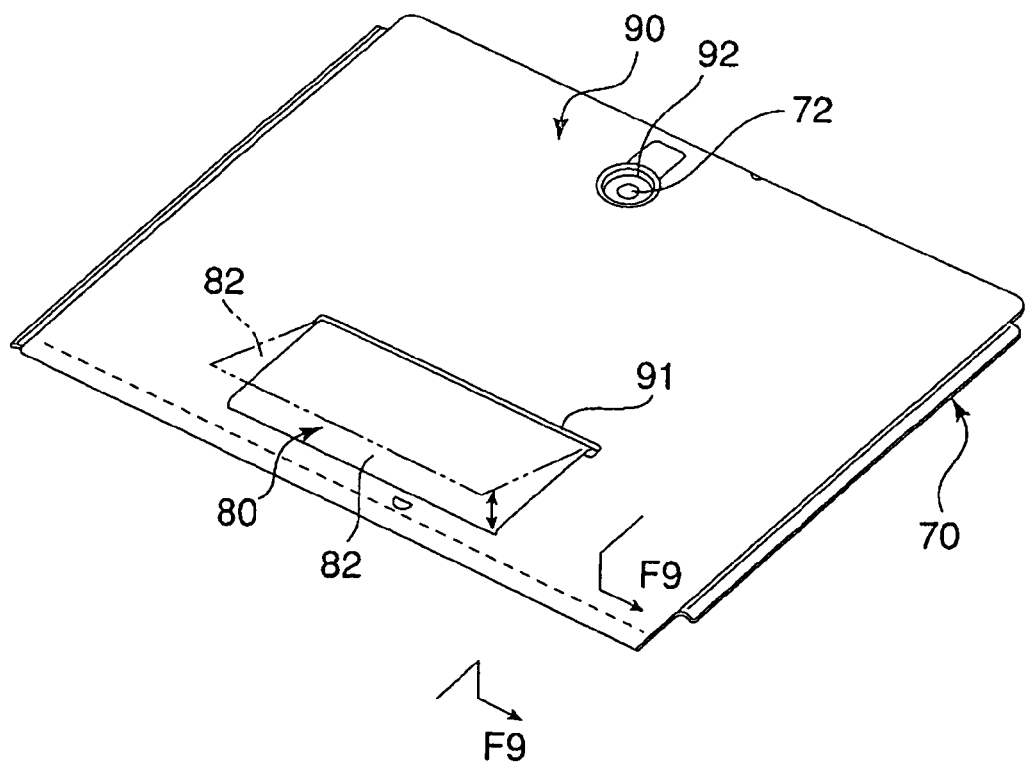
FIG. 8 is a perspective view illustrating a state in which a hole covering insulator is fixed to the slide cover shown in FIG. 7

FIG. 8 exemplary shows a state in which the first hole closing insulator 90 is installed on the upper surface 73 of the slide cover 70. The first hole closing insulator 90 is made of, for example, a resin and is in the form of a thin film. The first hole closing insulator 90 may be fixed by such as an adhesive or a double-sided adhesive tape.

As exemplary shown in FIG. 8, the first hole closing insulator 90 has substantially the same area as that of the slide cover 70. The first hole closing insulator 90 has a size which covers all the through holes 71. Each through hole 71 is liquid-tightly closed by the first hole closing insulator 90.

A slit 91 is formed in the first hole closing insulator 90. The slit 91 is formed in a linear shape, and penetrates the first hole closing insulator 90. The slit 91 is formed at a position opposing the grip portion 82, and has a size allowing the grip portion 82 to pass therethrough.

When the first hole closing insulator 90 is fixed to the slide cover 70, the grip portion 82 is passed through the slit 91, and projects to the upper surface side of the first hole closing insulator 90. The grip portion 82 projects to the outside.

A screw through hole 92, through which the below-described screw 160 is passed, is formed in the range of the first hole closing insulator 90 which opposes the screw through hole 72.

Figure 9:
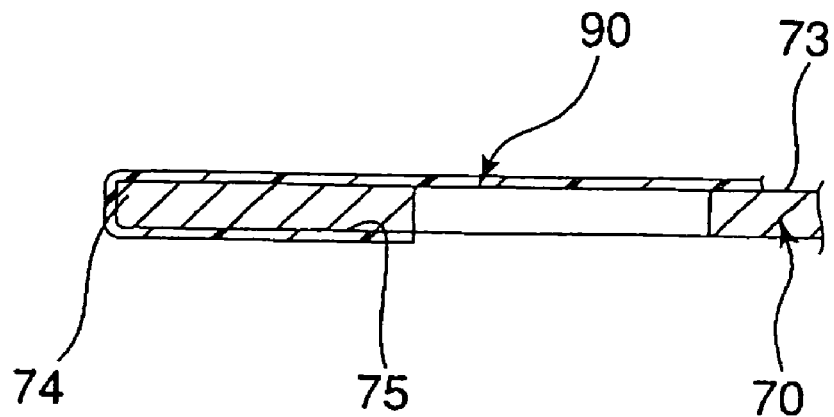
FIG. 9 is a cross-sectional view taken along line F9-F9 shown in FIG. 8

FIG. 9 is an exemplary cross-sectional view taken along line F9-F9 shown in FIG. 8. FIG. 9 exemplary shows a cross section, taken along the transverse direction, of a front end 74 of the slide cover 70. In the slide cover 70, the front side refers to that portion which is located on the front edge 53b side of the opening 53 when the slide cover 70 is disposed above the opening 53.

As exemplary shown in FIG. 9, the first hole closing insulator 90 has a size for covering the front end 74 of the slide cover 70. In the embodiment, the first hole closing insulator 90 has such a size that it is folded back at the front edge 74 of the slide cover 70, and is turned around to a lower surface 75 of the slide cover 70. The front end 74 of the slide cover 70 is covered by the first hole closing insulator 90.

The seal member 100 is provided between the slide cover 70 and the edge portions 55 of the opening 53. The seal member 100 liquid-tightly the opening 53 in a state in which the slide cover 70 is engaged with the casing 21 so as to cover the opening 53.

As exemplary shown in FIG. 2, the seal member 100 is annular, is larger than the edges 56 of the opening 53, and is arranged on the edge portions 55. The seal member 100 is formed of a sponge, and is relatively deformable. The seal member 100 may be formed from a porous elastic member such as a sponge.

The engaging mechanism 110 causes the slide cover 70 to engage the casing 21 in a state in which the opening 53 is liquid-tightly sealed by the slide cover 70 and the seal member 100.

The engaging mechanism 110 has first retaining portions 111, second retaining portions 112, first pawl portions 120, and second pawl portions 130.

As exemplary shown in FIG. 4, as the first retaining members 111, two first retaining members 111 are formed at a left edge portion 55a among the edge portions 55 of the opening 53. The first retaining portions 111 are formed one each at a transversely intermediate position and on the rear side of the left edge portion 55a.

Figure 13:
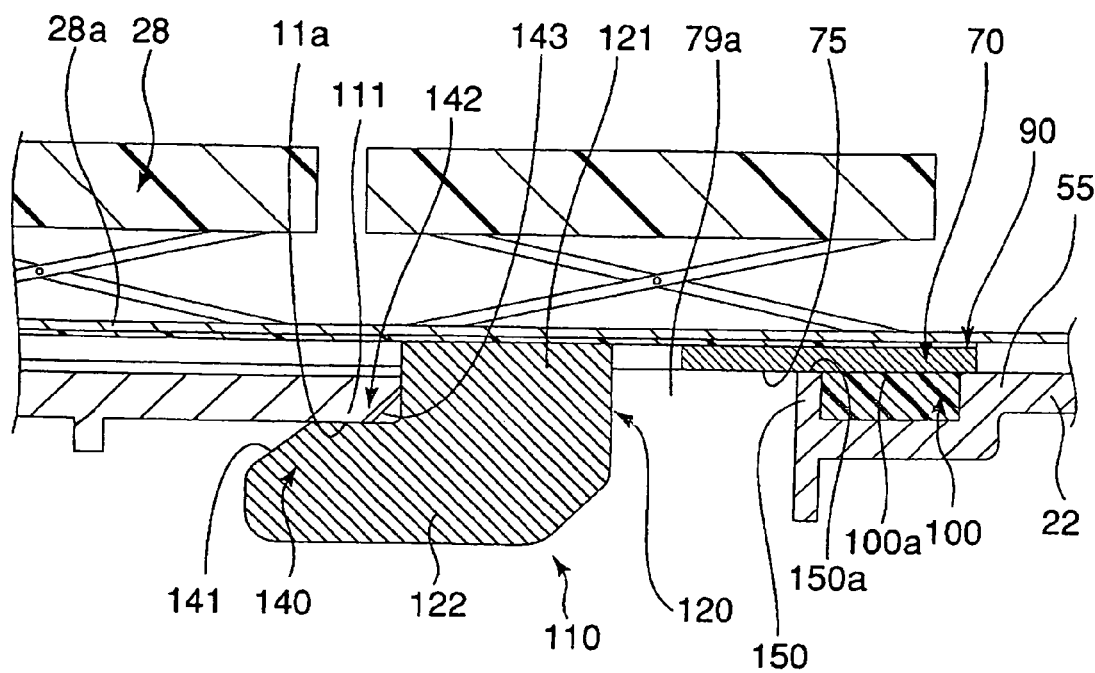
FIG. 13 is a cross-sectional view, taken along a transverse direction, of a state in which the first pawl portion shown in FIG. 5 is engaged with the first retaining portion shown in FIG. 4.

FIG. 13 is an exemplary cross-sectional view illustrating a state in which the below-described first pawl portion 120 is engaged with the first retaining portion 111. FIG. 13 shows a cross section, taken along the transverse direction, of the first retaining portion 111. As exemplary shown in FIG. 13, the first retaining portion 111 extends in the transverse direction. The first pawl portion 120 engages a lower surface 11a of the first retaining portion 111.

Figure 10:
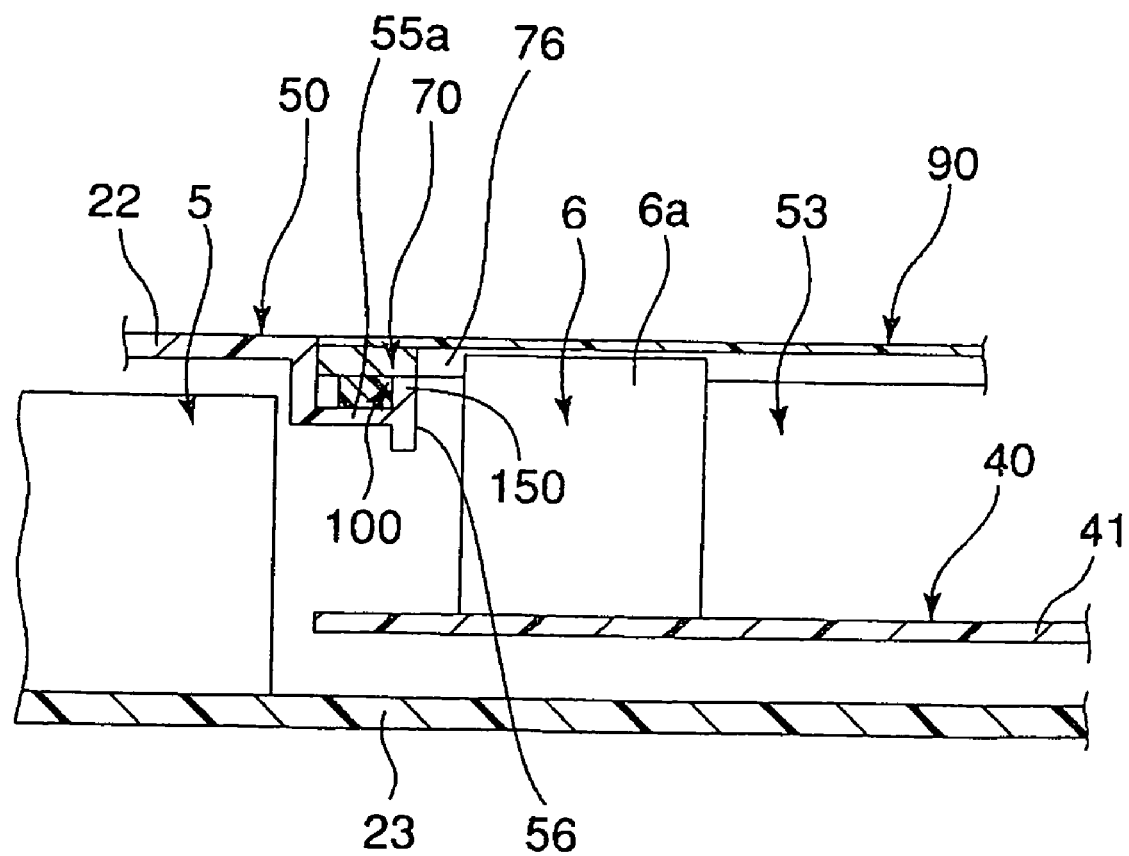
FIG. 10 is a cross-sectional view taken along line F10-F10 shown in FIG. 6

Here, a description will be given of the parts which are disposed in the vicinities of the left edge portion 55a among the edge portions 55 in the casing 21. FIG. 10 is an exemplary cross-sectional view taken along line F10-F10 shown in FIG. 6. FIG. 10 exemplary shows a cross section, taken in the widthwise direction, of the left edge portion 55a and its vicinity among the edge portions 55 in the casing 21.

As exemplary partially shown in FIGS. 4 and 10, a fan unit 5 is disposed on the immediately left rear side of the left edge portion 55a among the edge portions 55 in the casing 21. The fan unit 5 has substantially the same height as the height from the lower wall portion 23 to the upper wall portion 22 of the casing 21, for example. In FIG. 4, the fan unit 5 is shown by dotted lines. Therefore, the space defined between the left edge portion 55a among the edge portions 55 and the fan unit 5 is small.

As exemplary shown in FIG. 10, a first part 6 is mounted on the wiring board 41 on the immediately inner side (right side in the drawing) of the left edge portion 55a. The first part 6 is not shown in FIG. 4. An upper surface portion 6a of the first part 6 is located higher than a lower surface 75 of the slide cover 70 in the state in which the slide cover 70 is engaged with the casing 21.

As exemplary shown in FIG. 5, an accommodating hole 76 as an accommodating portion is formed in the range of the slide cover 70 which opposes the first part 6. The accommodating hole 76 penetrates the slide cover 70. As the upper surface portion 6a of the first part 6 is accommodated in the accommodating hole 76, the interference between the first part 6 and the slide cover 70 is prevented. The accommodating portion is not limited to the accommodating hole 76. For example, the accommodating portion may not penetrate the slide cover 70. Since it suffices if the accommodating portion is capable of accommodating the upper portion of the part having the possibility of interfering with the slide cover 70 as in the case of the first part 6, the accommodating portion may be formed in the shape of a groove, for example. The accommodating hole 76 is liquid-tightly closed by the first hole closing insulator 90.

As described above, the rear side of the left edge portion 55a of the opening 53 is located between the fan unit 5 and the first part 6 in the widthwise direction. The width of the first retaining portion 111 is small. The width of the first retaining portion 111 is a length which extends toward the farther side in the direction perpendicular to the plane of the drawing of FIG. 13.

As exemplary shown in FIG. 4, as the second retaining portions 112, three second retaining portions 112 are formed in a right edge portion 55b among the edge portions 55. The second retaining portions 112 are arranged in the transverse direction at substantially equal intervals, for example. Another second retaining portion 112 is formed on the front side of the left edge portion 55a among the edge portions 55.

Still another second retaining portion 112 is formed in the substantially widthwise center of the front side of the opening 53. This second retaining portion 112 may be formed integrally with, for example, a front portion of the edge portion 55. Alternatively, this second retaining portion 112 may be formed in the circuit module 40.

Figure 14:
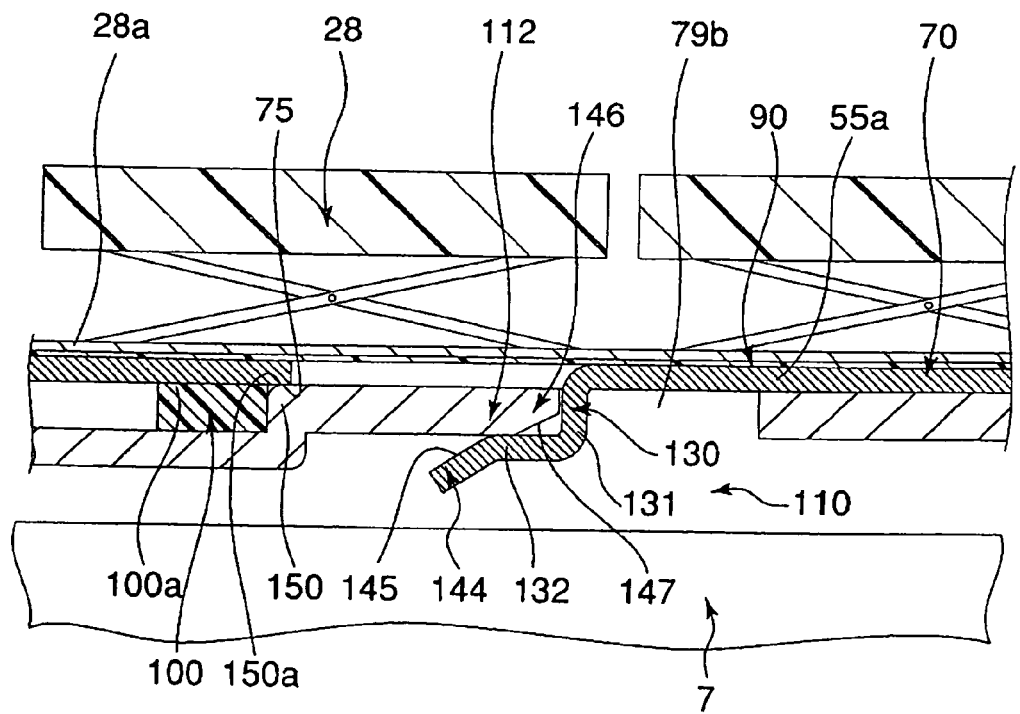
FIG. 14 is a cross-sectional view, taken along the transverse direction, of a state in which the second pawl portion shown in FIG. 5 is engaged with the second retaining portion shown in FIG. 4.

FIG. 14 is an exemplary cross-sectional view illustrating a state in which the below-described second pawl portion 130 is engaged with the second retaining portion 112 which is formed on the front side of the left edge portion 55a among the edge portions 55. FIG. 14 exemplary shows a cross section, taken along the transverse direction, of the second retaining portion 112. As exemplary shown in FIG. 14, the second retaining portion 112 extends in the transverse direction. The other second pawl portions 130 may be formed in similar shapes.

A description will be given of a part which is disposed in the vicinity of the front side of the left edge portion 55a among the edge portions 55 in the casing 21. As exemplary shown in FIG. 14, a second part 7 such as a disk unit is accommodated below the left edge portion 55a of the opening 53. The space defined between the second part 7 and the left edge portion 55a among the edge portions 55 is small.

Similarly, an unillustrated third part is disposed below the right edge portion 55b among the edge portions 55. The space defined between this third part and the second retaining portion 112 formed in the right edge portion 55b is small.

Similarly, an unillustrated fourth part is disposed below the substantially widthwise center of the front side of the opening 53. The space defined between the fourth part and the second retaining portion formed in the substantially widthwise center of the front side of the opening 53 is small.

As exemplary shown in FIG. 5, as the first pawl portions 120, two first pawl portions are formed on a left edge portion 77 of the slide cover 70. The shapes of the respective first pawl portions 120 are the same. The first pawl portions 120 are respectively disposed in such a manner as to be spaced apart in the transverse direction. One first pawl portion 120 is engaged with one first retaining portion 111. The other first pawl portion 120 is engaged with the other first pawl portion 120.

Figure 11:
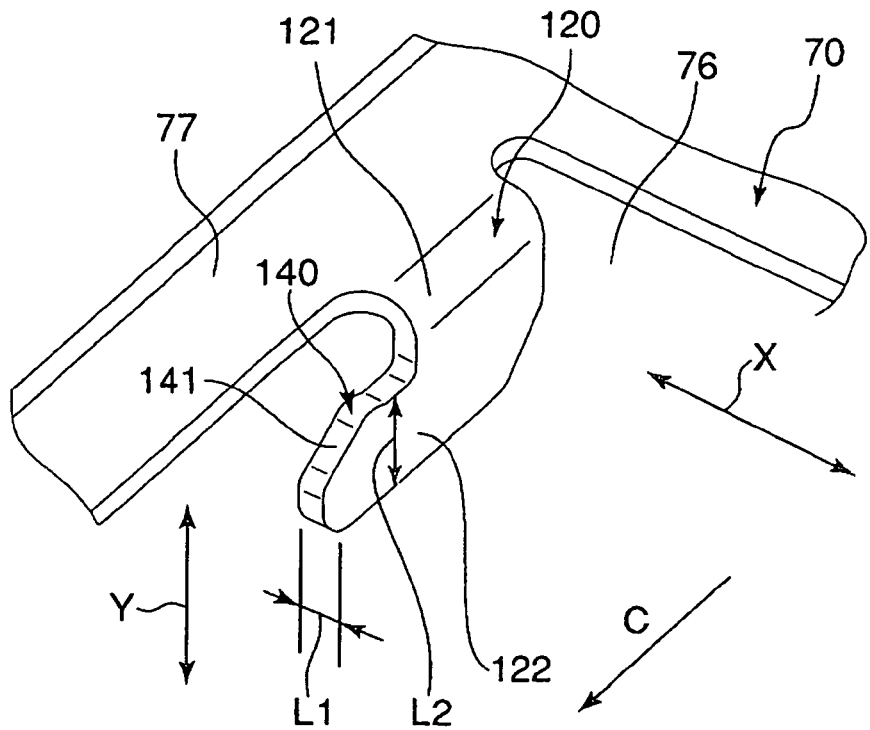
FIG. 11 is a perspective view illustrating in enlarged form a first pawl portion shown in FIG. 5

FIG. 11 exemplary shows in enlarged form the first pawl portion 120 which is disposed in the rear. As exemplary shown in FIG. 11, the first pawl portion 120 is formed by a portion of the slide cover 70. Specifically, when the accommodating hole 76 is formed, a shape corresponding to the first pawl portion 120 is kept left in the slide cover 70. Then, the first pawl portion 120 is formed by downwardly bending the portion left as just mentioned. The accommodating hole 76 is liquid-tightly closed by the first hole closing insulator 90.

The first pawl portion 120 has a base portion 121 and a body portion 122. The base portion 121 is connected to the left edge portion 77. The base portion 121 is bent and extends downwardly.

The body portion 122 is formed integrally with a lower end portion of the base portion 121. The body portion 122 extends forwardly from the base portion 121. In the first pawl portion 120, the body portion 122 is engaged with the first retaining portion 111.

A first width L1 of the body portion 122 is small so as to avoid interference with the fan unit 5 and the first part 6. In addition, a first thickness L2 in the heightwise direction of the body portion 122 is greater than the width L1 so as to maintain the strength of the body portion 122.

The first width L1 is a width extending in a widthwise direction X of the casing 21, i.e., in a direction oriented from the left wall portion 27 toward the right wall portion 26 or a direction oriented from the right wall portion 26 toward the left wall portion 27. The first thickness L2 is a thickness extending in a vertical direction Y of the casing 21, i.e., in a direction oriented from the lower wall portion 23 toward the upper wall portion 22 or a direction oriented from the upper wall portion 22 toward the lower wall portion 23.

The widthwise direction X is a direction perpendicular to the sliding direction referred to in the invention and to the heightwise direction. The vertical direction Y is the heightwise direction referred to in the invention.

As exemplary shown in FIG. 5, the second pawl portion 130 is formed at a position corresponding to the second retaining portion 112 in the slide cover 70. Each second pawl portion 130 is engaged with a corresponding second retaining portion 112.

Specifically, three second pawl portions 130 are formed on a right edge portion 78 of the slide cover 70 in correspondence with the three second retaining portions 112 formed in the right edge portion 55b among the edge portions 55 of the opening 53. The second pawl portions 130 are arranged in such a manner as to be spaced apart at substantially equal intervals in the transverse direction.

In addition, another second pawl portion 130 is formed at the substantially widthwise center of the front side of the slide cover 70 in correspondence with the second retaining portion 112 formed in the substantially widthwise center of the front side of the opening 53.

Furthermore, still another second pawl portion 130 is formed on the front side of the left edge portion 77 of the slide cover 70 in correspondence with the second retaining portion 112 formed on the front side of the left edge portion 55a among the edge portions 55 of the opening 53.

Figure 12:
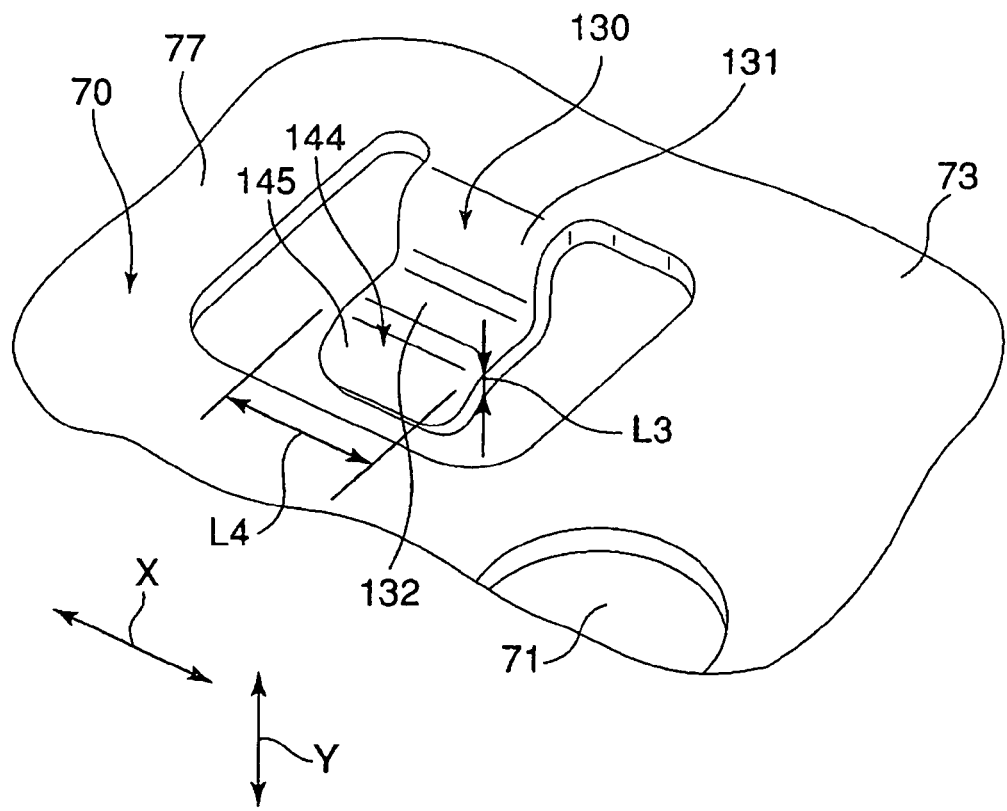
FIG. 12 is a perspective view illustrating in enlarged form a second pawl portion shown in FIG. 5.

FIG. 12 shows the second pawl portion 130 formed on the front side of the left edge portion 77 of the slide cover 70. Since the respective pawl portions 130 may be similar, a description will be given by using as a representative example the second pawl portion 130 formed on the front side of the left edge portion 77 of the slide cover 70.

The second pawl portion is formed integrally with the slide cover 70. Specifically, when the second pawl portion 130 is formed, a portion of the slide cover 70 which surrounds the portion corresponding to the second pawl portion 130 is, for example, cut off. The second pawl portion 130 is formed by downwardly bending the portion left as just mentioned. It should be noted that the portion removed by being cut off as described above is liquid-tightly closed by the first hole closing insulator 90.

The second pawl portion 130 has a base portion 131 and a body portion 132. The base portion 131 is connected to the slide cover 70. The base portion 131 is bent and extends downwardly. The body portion 132 is formed integrally with a lower end portion of the base portion 131. The body portion 132 extends forwardly from the base portion 131. In the second pawl portion 130, the body portion 132 is engaged with the second retaining portion 112.

A second thickness L3 in the heightwise direction of the body portion 132 is small so as to avoid interference with the second to fourth parts and the body portion 132. A second width L4 of the body portion 132 is greater than the second thickness L3 so as to maintain the strength of the body portion 132.

The second width L4 is a width extending in the widthwise direction X of the casing 21, i.e., in the direction oriented from the left wall portion 27 toward the right wall portion 26 or the direction oriented from the right wall portion 26 toward the left wall portion 27. The second thickness L3 is a thickness extending in the vertical direction Y of the casing 21, i.e., in the direction oriented from the lower wall portion 23 toward the upper wall portion 22 or the direction oriented from the upper wall portion 22 toward the lower wall portion 23.

The thickness L3 of the body portion 132 of the second pawl portion 130 formed in the substantially widthwise center of the front side of the slide cover 70 is formed to be small to avoid interference with the fourth part located below this body portion 132. Similarly, the thickness L3 of the body portion 132 of each of the three second pawl portions 130 formed on the right edge portion 78 of the slide cover 70 is formed to be small to avoid interference with the third part located below these body portions 132.

The first and second pawl portions 120 and 130 formed, as described above, are engaged with the corresponding first and second retaining portions 111 and 112 as the slide cover 70 is slid forward. As exemplary shown in FIGS. 4 and 13, a first through hole 79a, into which the corresponding first pawl portion 120 is vertically inserted, is formed in the rear of the first retaining portion 111 in the edge portion 55. Similarly, as exemplary shown in FIGS. 4 and 14, a second through hole 79b, into which the corresponding second pawl portion 130 is vertically inserted, is formed in the rear of the second retaining portion 112 in the edge portion 55.

In the case of the second retaining portion 112 formed on the front side of the opening 53 in the substantially widthwise center, the rear side of this retaining portion is open. The second through hole 79b may not be formed in the rear of this second retaining portion 112.

When the slide cover 70 is installed on the casing 21, the first and second pawl portions 120 and 130 are inserted into the corresponding first and second through holes 79a and 79b. Then, as the slide cover 70 is slid forwardly, the body portions 122 and 132 of the respective first and second pawl portions 120 and 130 are engaged with the corresponding first and second retaining portions 111 and 112.

Therefore, as exemplary shown in FIG. 13, a first guide portion 140 is formed at the tip of the body portion 122 of the first pawl portion 120. An upper surface 141 of the first guide portion 140 is inclined in a diagonally forward and downward direction. A second guide portion 142 is formed at the tip of the first retaining portion 111. A lower surface 143 of the second guide portion 142 is inclined in a diagonally forward and downward direction.

As exemplary shown in FIG. 14, a third guide portion 144 is formed at the tip of the body portion 132 of the second pawl portion 130. An upper surface 145 of the third guide portion 144 is inclined in a diagonally forward and downward direction. A fourth guide portion 146 is formed at the tip of the second retaining portion 112. A lower surface 147 of the fourth guide portion 146 is inclined in a diagonally forward and downward direction.

Figure 15:
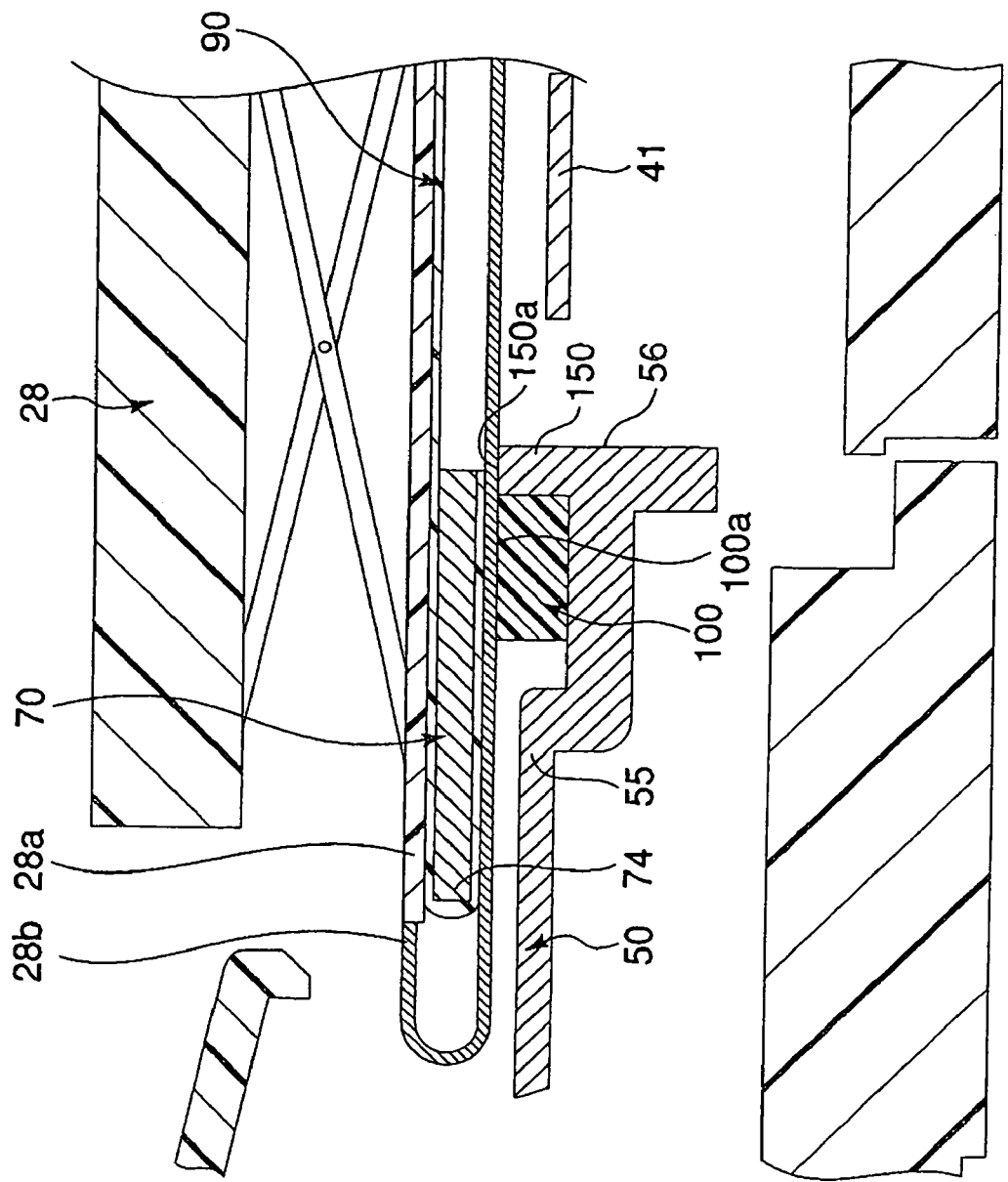
FIG. 15 is a cross-sectional view, taken along the transverse direction, of a front end of the slide cover and its vicinity in the state in which the slide cover is engaged with the casing.

FIG. 15 exemplary shows the front end 74 and its vicinity of the slide cover 70 in the state in which the slide cover 70 is engaged with the casing 21.

As exemplary shown in FIGS. 13, 14, and 15, a rib 150 for restricting the degree of collapse of the seal member 100 is formed at the respective edge portion 55 of the opening 53. As exemplary shown in FIG. 4, the rib 150 is formed in a annularly rectangular shape, and is formed over the entire peripheries of the edges 56 of the opening 53. The rib 150 is formed between the seal member 100 and each edge 56. Therefore, the rib 150 is located on the inner side of the seal member 100.

Figure 16:
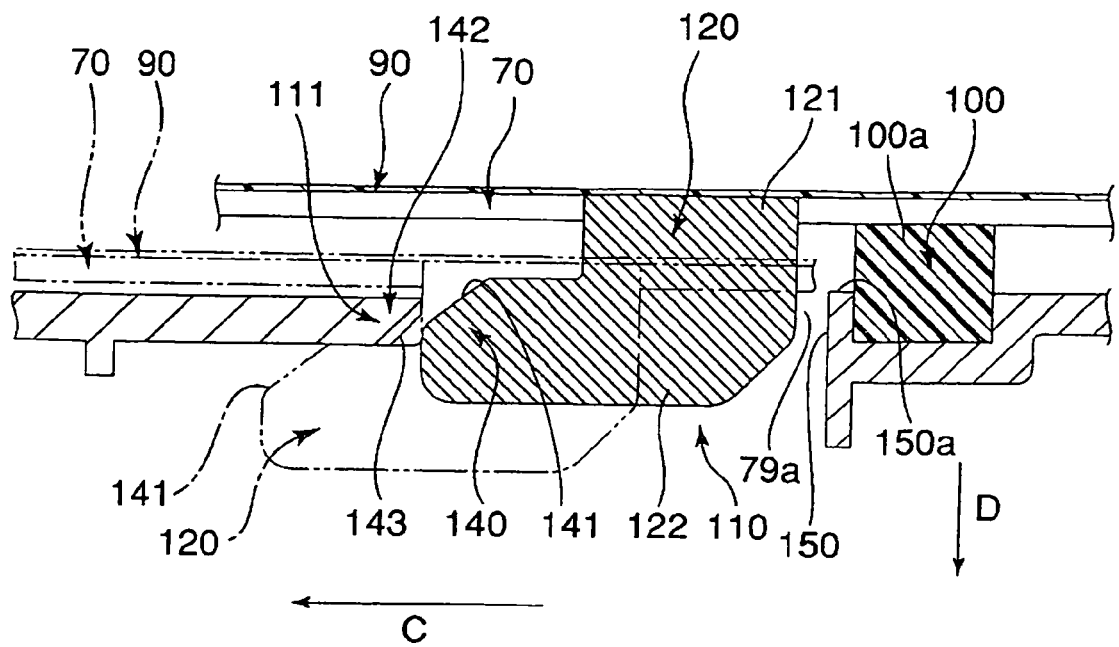
FIG. 16 is a cross-sectional view, taken along the transverse direction, of the first pawl portion and its vicinity in states before and after the slide cover is slid.
Figure 17:
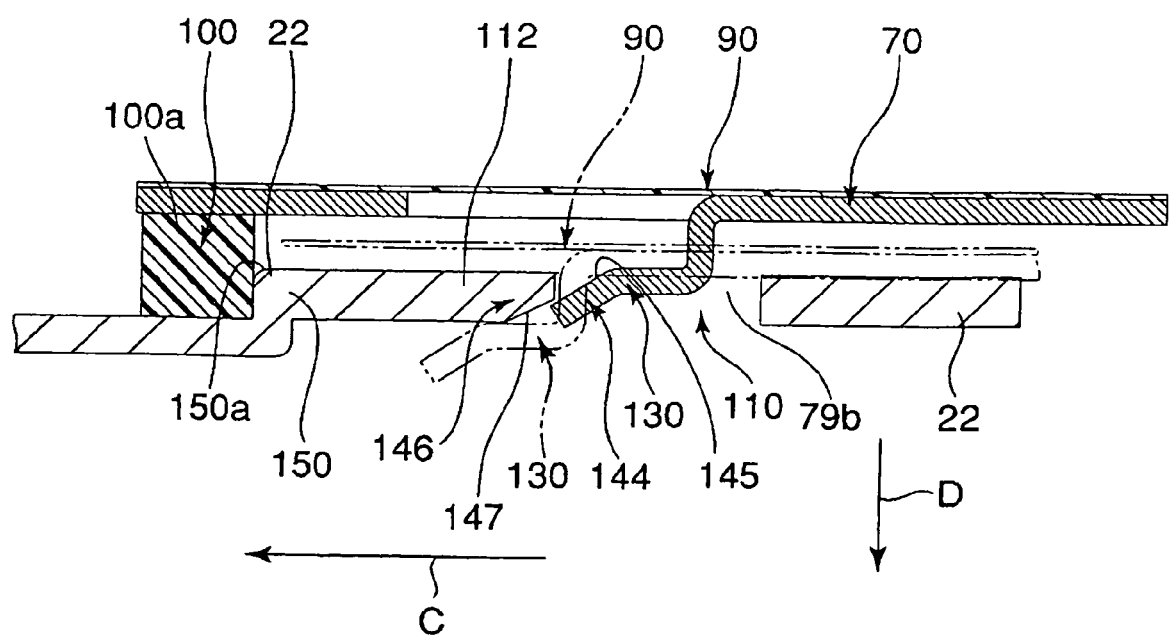
FIG. 17 is a cross-sectional view, taken along the transverse direction, of the second pawl portion and its vicinity in states before and after the slide cover is slid.

The slide cover 70 side end portion, i.e., an upper end portion 100a, of the seal member 100 projects upwardly of an upper surface 150a of the rib 150 (exemplary shown in FIGS. 16 and 17). The upper surface 150a serves as a distal end of the rib.

The rib 150 abuts against the lower surface 75 of the slide cover 70 when the respective first and second pawl portions 120 and 130 are engaged with the corresponding first and second retaining portions 111 and 112. At this time, the seal member 100 is collapsed between the slide cover 70 and the edge portions 55.

As the rib 150 abuts against the lower surface 75 of the slide cover 70, the slide cover 70 is prevented from moving downwardly. Namely, the downward movement of the slide cover 70 is restricted by the rib 150.

Next, a description will be given of installing the slide cover 70 on the casing 21. First, the grip member 80 is mounted on the upper surface 73 of the slide cover 70. Next, the first hole closing insulator 90 is mounted on the upper surface of the slide cover 70. At this time, the grip portion 82 is passed through the slit 91 and projects upwardly of the first hole closing insulator 90.

Next, the slide cover 70 is installed on the casing 21. At this time, the seal member 100 is interposed between the slide cover 70 and the edge portions 55 of the opening 53.

Next, as exemplary shown in FIG. 15, the wirings which are electrically connected to the respective connectors 42 to 46, including a flexible circuit board 28b of the keyboard 28, are passed between the seal member 100 and the slide cover 70, and are electrically connected to the corresponding connectors 42 to 46 such as the keyboard connector 45 which is mounted on the wiring board 41. The flexible circuit board 28b serves as the wiring.

Next, the slide cover 70 is assembled to the casing 21. At this time, the first pawl portions 120 are inserted into the first through holes 79a, and the second pawl portions 130 are inserted into the second through holes 79b. FIG. 16 exemplary shows a cross section, taken in the transverse direction, of a state in which the first pawl portion 120 is inserted in the first through hole 79a. FIG. 17 exemplary shows a cross section, taken in the transverse direction, of a state in which the second pawl portion 130 is inserted in the second through hole 79b.

At this time, as exemplary shown in FIGS. 16 and 17, the first and second pawl portions 120 and 130 are not yet engaged with the first and second retaining portions 111 and 112.

Next, the slide cover 70 is slid in the forward direction. An operator slides the slide cover 70 by pulling the grip portion 82 of the grip member 80. As exemplary shown by arrow C in FIG. 16, as the slide cover 70 is lid in the forward direction, the upper surface 141 of the first guide portion 140 of the first pawl portion 120 slides along the lower surface 143 of the second guide portion 142 of the first retaining portion 111.

In addition, as exemplary shown in FIG. 17, when the slide cover 70 is slid in a forward direction C, the upper surface 145 of the third guide portion 144 of the second pawl portion 130 slides along the lower surface 147 of the fourth guide portion 146 of the second retaining portion 112.

As described above, as the upper surface 141 of the first guide portion 140 slides along the lower surface 143 of the second guide portion 142, and the upper surface 145 of the third guide portion 144 slides along the lower surface 147 of the fourth guide portion 146, the slide cover 70 is slid in the forward direction, and is concurrently sunk in a downward direction D.

Therefore, the first and second pawl portions 120 and 130 are sunk in the downward direction D, as exemplary shown by the two-dot chain lines in FIGS. 16 and 17, and are engaged with the first and second retaining portions 111 and 112. The first and second pawl portions 120 and 130 exemplary shown by the two-dot chain lines in FIGS. 16 and 17 are in the state of being engaged with the first and second retaining portions 111 and 112.

As the slide cover 70 is sunk in the downward direction while being slid in the forward direction, as described above, the seal member 100 is collapsed between the edge portions 55 and the slide cover 70.

The seal member 100, exemplary shown in FIGS. 16 and 17, is in the state before being collapsed between the slide cover 70 and the edge portions 55. The seal member 100, exemplary shown in FIGS. 13, 14, and 15, is in the state of having been collapsed between the slide cover 70 and the edge portions 55 of the opening 53.

Next, when the first and second pawl portions 120 and 130 are engaged with the first and second retaining portions 111 and 112, as exemplary shown in FIGS. 13 and 14, the slide cover 70 is fixed to the casing 21 by the screw 160, as exemplary shown in FIG. 6. The screw 160 is passed through the screw through hole 72 formed in the slide cover 70, and is threadedly engaged with a threaded portion 57 provided in the opening 53 in the circuit module 40, for example. The threaded portion 57 is exemplary shown in FIG. 4.

As the slide cover 70 is fixed to the casing 21 by the screw 160, the slide cover 70 is prevented from sliding along the direction in which the first and second pawl portions 120 and 130 are disengaged from the first and second retaining portions 111 and 112.

After the screw 160 is fixed, as shown in FIG. 6, the second hole closing insulator 200 for liquid-tightly covering the through holes 72 and 92 is attached to the first hole closing insulator 90. The second hole closing insulator 200 is made of, for example, a resin and is in the form of a thin film.

The second hole closing insulator 200 is an example of a covering member for covering a screw referred to in the invention. As a result, a liquid such as water is prevented from entering the interior of the casing 21 through the screw through hole 72.

After the slide cover 70 is fixed to the casing 21, the keyboard 28 is disposed on the keyboard mounting portion 50 from a base plate 28a side of the keyboard 28.

In the portable computer 10 thus formed, the range occupied by the opening 53, i.e., the opening area S, is less than half of the range (area) occupied by the keyboard mounting portion 50. Therefore, the entire perimeter of the edges 56 of the opening 53 becomes small. Namely, when a liquid such as water enters the interior of the casing 21, the liquid conceivably enters between the edges 56 of the opening 53 and the slide cover 70; however, since the entire periphery of the edges 56 becomes short, the liquid is made difficult to enter the interior of the casing 21.

Accordingly, in the portable computer 10, a liquid such as water is made difficult to enter the interior of the casing 21.

Further, as the opening 53 is made small, the size of the slide cover 70 can also be made small. Therefore, it is possible to lower the cost of the slide cover 70. Furthermore, as the slide cover 70 becomes small, the portable computer 10 is made lightweight. Similarly, since the first hole closing insulator 90 and the seal member 100 are restrained from becoming large-sized, low cost and light weight are attained.

In addition, the front edge 53b of the opening 53 is located rearwardly of the front edge 51 of the keyboard mounting portion 50. For this reason, the gap A is defined between the front edge 53b and the front edge 51.

In the case where the keyboard 28 is tilted by setting the front side of the keyboard 28 lower than the rear side to improve the operability of the keyboard 28, even in the event that a liquid has spilled onto the keyboard 28, the liquid stays in the gap A. A liquid is restrained from entering the interior of the casing 21.

In addition, as the seal member 100 is provided, the entry of the liquid into the casing 21 is restrained.

In addition, since the slide cover 70 is supported by the rib 150, the keyboard 28 is restrained from moving in the downward direction D. Therefore, a trampoline phenomenon (vertical movement of the key) which occurs during key entry is restrained.

The seal member 100 projects upwardly of the rib 150. Therefore, the seal member 100 is collapsed, so that the opening 53 is liquid-tightly sealed effectively.

The rib 150 is located between each ridge 56 of the rib 150 and the seal member 100. Therefore, the rib 150 comes to have the function of preventing the entry of a liquid into the casing 21. Accordingly, the entry of the liquid into the casing 21 is restrained.

The first and second pawl portions 120 and 130 serving as engaging portions are formed on the slide cover 70, while the first and second retaining portions 111 and 112 are formed in the casing 21. The first and second pawl portions 120 and 130 and the first and second retaining portions 111 and 112 are engaged with each other.

Therefore, the slide cover 70 can be fixed effectively to the casing 21.

Since the slide cover 70 is engaged with the casing 21 merely by being slid, the operating efficiency in the engaging operation of engaging the slide cover 70 and the casing 21 improves.

Since the grip member 80 is fixed to the slide cover 70, the operator is able to efficiently slide the slide cover 70 by using the grip member 80.

In addition, as for the first pawl portion 120, the first width L1 is smaller than the first thickness L2 in the heightwise direction. As the first pawl portion 120 thus formed is formed at a portion which is limited in the widthwise direction X by, for example, being located between such as the fan unit 5 and the first part 6 in the widthwise direction X, even such a portion which is limited in the widthwise direction X is capable of preventing interference between the engaging portion and its surrounding part.

Furthermore, as for the second pawl portion 130, the second width L4 is greater than the second thickness L3 in the heightwise direction. As the second pawl portion 130 thus formed is formed at a portion which is limited in the heightwise direction by having, for example, the second to fourth parts disposed therebelow, even such a portion which is limited in the heightwise direction is capable of preventing interference between the engaging portion and its surrounding part.

In other words, by selectively using the first and second pawl portions 120 and 130, as described above, the casing 21 may not enlarge in consideration of the above-described interference. Accordingly, it is possible to restrain the casing 21 from becoming large. Further, by selectively using the first and second pawl portions 120 and 130, the limitation on the arrangement of these pawl portions is alleviated. Therefore, it is possible form a large number of engaging portions on the slide cover 70. Specifically, it is possible to form the engaging portions in substantially the entire region of the left edge portion 55a and in substantially the entire region of the right edge portion 55b among the edge portions 55 of the opening 53. Similarly, a large number of retaining portions on the edge portions 55. Therefore, the slide cover 70 is firmly engaged with the casing 21.

In addition, the slide cover 70, after being slid, is fixed to the casing 21 by the screw 160. Therefore, the slide cover 70 is prevented from moving in the direction in which the first and second pawl portions 120 and 130 and the first and second retaining portions 111 and 112 are disengaged. Namely, since the slide cover 70 is restrained from coming off the casing 21, a liquid such as water is restrained from entering the interior of the casing 21.

In addition, the through hole 71, the accommodating hole 71, and the first and second pawl portions 120 and 130 are liquid-tightly closed by the first hole closing insulator 90. Therefore, a liquid such as water is restrained from entering the interior of the casing 21.

Further, by virtue of the adoption of the structure in which the first hole closing insulator 90 is provided, the through hole 71 for attaining the light weight can be formed in the slide cover 70. Therefore, the portable computer 10 is made lightweight.

The first and second pawl portions 120 and 130 are formed from portions of the slide cover 70. Therefore, since the first and second pawl portions 120 and 130 are not formed by using separate members, the cost is reduced. Further, since the first and second pawl portions 120 and 130 are formed integrally with the slide cover 70, the strength of the first and second pawl portions 120 and 130 improves.

The fixed portion 81 of the grip member 89 is located between the slide cover 70 and the first hole closing insulator 90. Namely, the first hole closing insulator 90 is provided with the function of fixing the grip member 80 to the slide cover 70. Therefore, the grip member 80 is restrained from coming off.

The first guide portion 140 is formed on the first pawl portion 120; the second guide portion 142 is formed on the first retaining portion 111; the third guide portion 144 is formed on the second pawl portion 130; and the fourth guide portion 146 is formed on the second retaining portion 112. As a result, the slide cover 70 sinks in the downward direction D by being merely slid in the forward direction C. As the slide cover 70 sinks, the seal member 100 is collapsed between each edge portion 55 and the slide cover 70, so that the opening 53 is liquid-tightly sealed. The downward direction D serves as the direction oriented from the cover toward the casing.

Namely, by merely sliding the slide cover 70, the operation of engaging the first and second pawl portions 120 and 130 and the first and second retaining portions 111 and 112 and the operation of collapsing the seal member 100 are effected simultaneously. Accordingly, the efficiency in the operation of assembling the slide cover 70 to the casing 21 improves.

In the embodiment, since the size of the slide cover 70 can be reduced to a small size, the sliding resistance occurring in the slide cover 70 is reduced to a small level. Therefore, the slide cover 70 can be slid relatively easily.

In addition, since the seal member 100 is formed of a sponge, the seal member 100 can be collapsed relatively easily. Further, the sliding resistance occurring between the seal member 100 and the slide cover 70 can be suppressed. Therefore, the efficiency in the operation of assembling the slide cover 70 improves.

In addition, since the wirings, such as the flexible circuit board 28b, which are connected to parts such as the connectors 42 to 46 which are mounted in the range opposing the opening 53 in the wiring board 41, are passed between the seal member 100 and the slide cover 70, it is possible to restrain the occurrence of a gap between the seal member 100 and the slide cover 70, which is ascribable to the wirings. Therefore, the entry of a liquid such as water into the casing 21 is restrained.

A specific description will be given of this aspect. For instance, in a case where the wirings are passed between the seal member and the edge portion 55, the wirings would be bent from the keyboard mounting portion 50 toward the edge portion 55. As the wirings are bent, a gap is likely to be formed. If the wirings are passed over the upper surface of the seal member 100, the bending of the wirings is restrained.

In addition, since the front end 74 of the slide cover 70, i.e., a leading end in the sliding direction of the slide cover 70, is covered by the first hole closing insulator 90 in the slide cover 70, peripheral wirings and the like are restrained from becoming damaged by the front end 74 when the slide cover 70 is slid.

Although the grip member 80 is fixed between the first hole closing insulator 90 and the slide cover 70, the invention is not limited to the same. For example, the grip member 80 may be fixed on the upper surface of the first hole closing insulator 90.

Next, referring to FIG. 18, a description will be given of the electronic apparatus in accordance with a second embodiment of the invention by citing the portable computer 10 as an example. It should be noted that constructions having functions similar to those of the first embodiment will be denoted by the same reference numerals, and a description thereof will be omitted.

In the embodiment, the structure of the first hole closing insulator 90 differs from that of the first embodiment. The other aspects may be similar to the first embodiment.

A specific description will be given of this aspect. FIG. 18 shows a state in which the first hole closing insulator 90 in this embodiment is fixed to the slide cover 70. As shown in FIG. 18, the grip portion 82 is formed integrally with the first hole closing insulator 90.

Therefore, in the embodiment, a grip member is not separately formed. Accordingly, in this embodiment, in addition to the advantages of the first embodiment, the number of parts can be reduced, thereby making it possible to lower the cost.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a casing comprising a circuit module, the casing including an upper wall portion and a lower wall portion, the circuit module being accommodated in the casing;
a keyboard mounting portion having a substantially widthwise center on which a keyboard is detachably mounted, the keyboard mounting portion comprising an opening including an edge portion, the opening allowing a wiring electrically connecting the keyboard and the circuit module to be passed therethrough, and an area of the opening being equal to or less than half of an area of the keyboard mounting portion, wherein the opening is formed in the upper wall portion and is located between the circuit module and the keyboard, and wherein a rib is provided on the edge portion; and
a cover separate from the keyboard and detachably covering the opening, the cover being substantially equal in size as the area of the opening.

2. The electronic apparatus according to claim 1, further comprising:
   a seal member interposed between the cover and the edge portion of the opening.

3. The electronic apparatus according to claim 2, wherein a cover side end portion of the seal member projects upwardly of a distal end of the rib.

4. The electronic apparatus according to claim 1, wherein a retaining portion is formed in the casing, and
   wherein an engaging portion engaging the retaining portion is formed on the cover.

5. The electronic apparatus according to claim 4, wherein the engaging portion and the retaining portion are engaged with each other, when the cover is slid.

6. The electronic apparatus according to claim 5, wherein the cover comprises a grip portion which is used at the time of sliding the cover.

7. The electronic apparatus according to claim 6, wherein the engaging portion comprises
   a first pawl portion comprising a body portion which extends in a sliding direction of the cover and whose width in a direction perpendicular to the sliding direction and a heightwise direction is smaller than a heightwise thickness thereof, and
   a second pawl portion comprising a body portion which extends in the sliding direction and whose heightwise thickness is smaller than a width in the direction perpendicular to the sliding direction and the heightwise direction, and
   wherein the retaining portion comprises
   a first retaining portion with which the body portion of the first pawl portion is engaged, the first retaining portion being provided at a portion of the case which is spacewise limited in the direction perpendicular to the sliding direction and the heightwise direction, and
   a second retaining portion with which the body portion of the second pawl portion is engaged, the second retaining portion being provided at a portion of the casing which is spacewise limited in the heightwise direction.

8. The electronic apparatus according to claim 5, wherein the cover is fixed to the casing by a screw while the engaging portion and the retaining portion are engaged with each other.

9. The electronic apparatus according to claim 8, wherein the cover comprises a covering member covering the screw.

10. The electronic apparatus according to claim 5, wherein a guide portion guiding the engagement between the engaging portion and the retaining portion is formed on each of the engaging portion and the retaining portion.

11. The electronic apparatus according to claim 10, wherein the guide portion causes the cover to sink downwardly when the cover is slid in the sliding direction of the cover.

12. The electronic apparatus according to claim 1, wherein the area of the opening is 10 percent to 30 percent of the area of the keyboard mounting portion.

13. The electronic apparatus according to claim 1, wherein an upper surface of the cover is substantially flush with an upper surface of the keyboard mounting portion.

14. The electronic apparatus according to claim 6, wherein the grip portion is movable with respect to the cover.

15. The electronic apparatus according to claim 2, wherein the seal member liquid-tightly seals the opening while the cover is engaged with the casing so as to cover the opening.

16. The electronic apparatus according to claim 1, wherein the rib prevents the cover from moving downwardly by abutting against the cover.

17. The electronic apparatus according to claim 1, wherein the rib is formed in an annularly rectangular shape.

18. The electronic apparatus according to claim 1, wherein the rib is formed over an entire periphery of the edge portion of the opening.

19. The electronic apparatus according to claim 1, wherein the opening is a single opening.

* * * * *